United States Patent
Krishnan et al.

(10) Patent No.: US 8,279,178 B2
(45) Date of Patent: Oct. 2, 2012

(54) SYSTEM AND METHOD FOR PERFORMING OPTICAL NAVIGATION USING HORIZONTALLY ORIENTED IMAGING LENS

(75) Inventors: Thineshwaran Gopal Krishnan, Bayan Baru (MY); Yat Kheng Leong, Cheras (MY); Sai Mun Lee, Sg Nibong (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 1102 days.

(21) Appl. No.: 11/948,843

(22) Filed: Nov. 30, 2007

(65) Prior Publication Data

US 2009/0141000 A1 Jun. 4, 2009

(51) Int. Cl.
*G06F 5/08* (2006.01)
(52) U.S. Cl. ..... 345/166; 345/175; 345/183; 178/18.09; 250/221

(58) Field of Classification Search .................. 345/166, 345/175, 179, 183; 250/221; 356/498; 178/18.05–18.09
See application file for complete search history.

(56) References Cited

U.S. PATENT DOCUMENTS

| | | | | |
|---|---|---|---|---|
| 7,189,985 | B2* | 3/2007 | Xie et al. | 250/559.29 |
| 7,715,016 | B2* | 5/2010 | Hwang et al. | 345/166 |
| 7,808,481 | B2* | 10/2010 | Lan | 345/163 |
| 2006/0256086 | A1* | 11/2006 | Xie et al. | 345/166 |

* cited by examiner

*Primary Examiner* — Lun-Yi Lao
*Assistant Examiner* — Sosina Abebe (57) ABSTRACT

A system and method for performing optical navigation uses an imaging lens, which is positioned between a target surface and an image sensor array, that is orientated to be substantially horizontal with respect to the target surface such that the optical axis of the imaging lens is substantially perpendicular to the target surface.

20 Claims, 7 Drawing Sheets

SYSTEM AND METHOD FOR PERFORMING OPTICAL NAVIGATION USING HORIZONTALLY ORIENTED IMAGING LENS

BACKGROUND OF THE INVENTION

Optical navigation systems detect relative movements between the optical navigation systems and navigation surfaces to perform tracking operations. An optical navigation system uses a light source, such as a light-emitting diode or a laser diode, with an illumination lens and an image sensor with an imaging lens to successively capture frames of image data of a navigation surface. The optical navigation system compares the successive frames of image data and estimates the relative movements between the optical navigation system and the navigation surface based on the comparison between the current frame of image data and a previous frame of image data. The optical navigation system is able to track the relative movements between the optical navigation system and the navigation surface by continuously capturing and comparing frames of image data. Optical navigation systems are commonly used in optical computer mice to track the lateral movements of the mice relative to the navigation surfaces on which the mice are manually manipulated.

In some optical navigation systems, the angle of incidence for the illumination light from the light source at the navigation surface is greater than zero with respect to the normal to the navigation surface. Thus, the angle of specular reflection is also greater than zero with respect to the normal to the navigation surface. In these optical navigation systems, the imaging lens is tilted to the angle of specular reflection in order to capture the maximum amount of specular reflection. However, for ease of manufacturing, the image sensor is not tilted to be parallel to the imaging lens. That is, the light receiving surface of the image sensor is not perpendicular to the optical axis of the imaging lens. For such orientation of the image sensor relative to the imaging lens, there are two significant drawbacks that will degrade the tracking performance of the optical navigation system. The first drawback is that modulation transfer function (MTF) across the field of view will not be even due to the field tilt. The second drawback is that distortion will be significantly high.

Thus, there is a need for a system and method for performing optical navigation with enhanced MTF and reduced distortion.

SUMMARY OF THE INVENTION

A system and method for performing optical navigation uses an imaging lens, which is positioned between a target surface and an image sensor array, that is orientated to be substantially horizontal with respect to the target surface such that the optical axis of the imaging lens is substantially perpendicular to the target surface. The orientation of the imaging lens enhances modulation transfer function (MTF) and reduces distortion for the system.

A system for performing optical navigation in accordance with an embodiment of the invention comprises a light source, an image sensor array and an imaging lens. The light source is positioned to emit illumination light onto a target surface at a nonzero angle of incidence with respect to the normal to the target surface. The image sensor array is positioned to receive the illumination light reflected from the target surface at a nonzero angle of reflection with respect to the normal to the target surface to produce frames of image data for correlation to estimate displacement with respect to the target surface. The imaging lens is positioned between the target surface and the image sensor array to receive and optically manipulate the illumination light reflected from the target surface at the nonzero angle of reflection onto the image sensor array. The imaging lens is orientated to be substantially horizontal with respect to the target surface such that the optical axis of the imaging lens is substantially perpendicular to the target surface.

A system for performing optical navigation in accordance with another embodiment of the invention comprises a light source, an image sensor with an array of photosensitive elements, an imaging lens and a processor. The light source is positioned to emit illumination light onto a target surface at a nonzero angle of incidence with respect to the normal to the target surface. The image sensor is positioned to receive the illumination light reflected from the target surface at a nonzero angle of reflection with respect to the normal to the target surface at the array of photosensitive elements to produce frames of image data. The imaging lens is positioned between the target surface and the image sensor to receive and optically manipulate the illumination light reflected from the target surface at the nonzero angle of reflection onto the array of photosensitive elements. The imaging lens is orientated to be substantially horizontal with respect to the target surface such that the optical axis of the imaging lens is substantially perpendicular to the target surface. The processor is operably connected to the image sensor to receive and correlate the frames of image data to estimate displacement with respect to the target surface.

A method for performing optical navigation in accordance with an embodiment of the invention comprises emitting illumination light onto a target surface at a nonzero angle of incidence with respect to the normal to the target surface, receiving the illumination light reflected from the target surface at a nonzero angle of reflection with respect to the normal to the target surface at an imaging lens, including optically manipulating the illumination light onto an image sensor array, the imaging lens being orientated to be substantially horizontal with respect to the target surface such that the optical axis of the imaging lens is substantially perpendicular to the target surface, and accumulating electrical signals at the image sensor array to produce frames of image data to estimate displacement with respect to the target surface.

Other aspects and advantages of the present invention will become apparent from the following detailed description, taken in conjunction with the accompanying drawings, illustrated by way of example of the principles of the invention.

DETAILED DESCRIPTION

Figure 1:
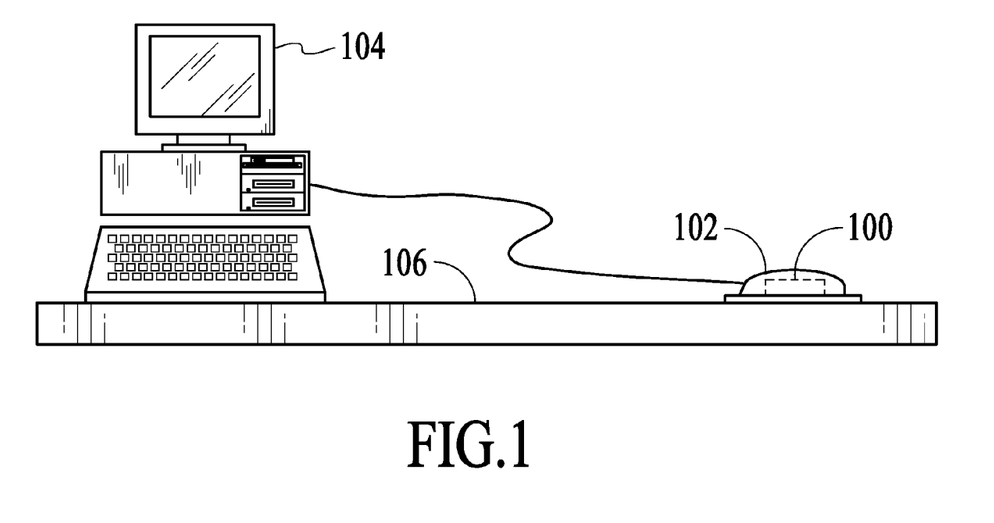
FIG. 1 shows an optical navigation system included in an optical computer mouse in accordance with an embodiment of the invention.

With reference to FIG. 1, an optical navigation system 100 in accordance with an embodiment of the invention is described. As shown in FIG. 1, the optical navigation system 100 is included in an optical computer mouse 102, which is connected to a computer 104. In other embodiments, the optical computer mouse 102 may be wirelessly connected to the computer 104. In this implementation, the optical navigation system 100 is used to optically track the movements of the optical mouse 102 as the optical mouse is manipulated over a navigation or target surface 106 by a user to control a cursor displayed on the computer 104. However, in other implementations, the optical navigation system 100 can be used in different products for various tracking applications. As described in detail below, the optical navigation system 100 is designed such that the imaging performance of the system is enhanced with respect to modulation transfer function (MTF) and distortion. As a result, the overall optical tracking performance of the optical navigation system 100 is improved.

Figure 2:
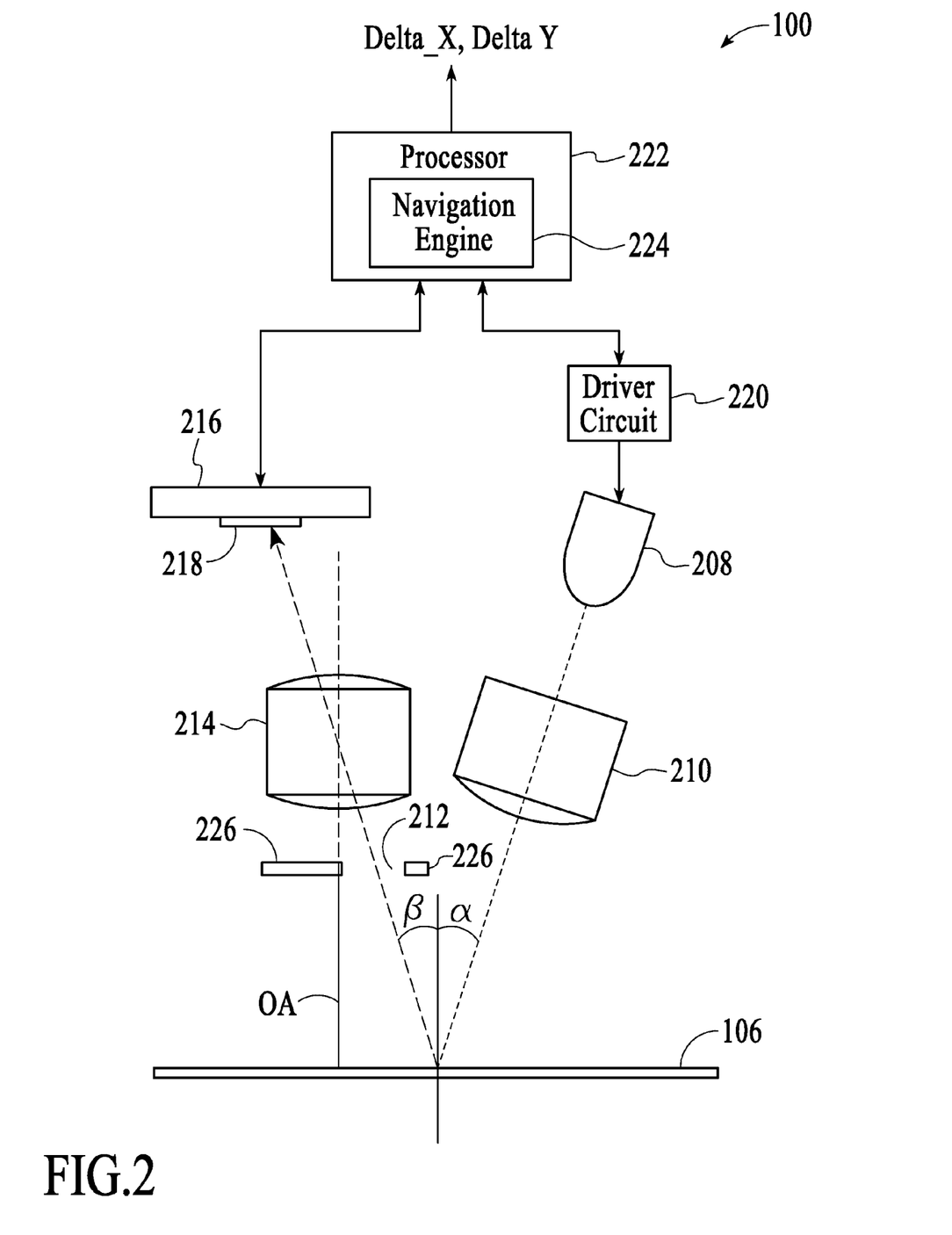
FIG. 2 is a block diagram of the optical navigation system included in the optical mouse of FIG. 1 in accordance with an embodiment of the invention.

As shown in FIG. 2, the optical navigation system 100 includes a light source 208, an illumination lens 210, an aperture 212, an imaging lens 214, an image sensor 216 with an array 218 of photosensitive elements (hereinafter "image sensor array"), a driver circuit 220 and a processor 222 with a navigation engine 224. Although these components of the optical navigation system 100 are shown in FIG. 2 as being separate components, some of these components may be integrated. As an example, the image sensor 216, the driver circuit 220 and the processor 222 with the navigation engine 224 may be integrated into a single integrated circuit chip.

The light source 208 is configured to emit light in response to an applied driving signal. The light source 208 can be any type of a light emitting device, such as a light-emitting diode (LED) or a laser diode. As an example, the light source 208 may be a vertical-cavity surface-emitting laser (VCSEL), which generates coherent laser beam of light. The light source 208 is activated by the driver circuit 220, which provides driving signals to the light source. The illumination lens 210 is positioned between the light source 208 and the target surface 106 to collimate or focus the light from the light source onto a region of the navigation surface to illuminate that region of the navigation surface. In an embodiment, the light source 208 and the illumination lens 210 are configured and positioned so that the angle of incidence of the illumination light at the navigation surface 106 is α, which is greater than zero with respect to the normal to the navigation surface. In this embodiment, the illumination lens 210 is orientated so that the optical axis of the illumination lens is substantially parallel to the angle of incidence of the illumination light. As used herein, the term "substantially" with respect to a defined angle or direction includes small variations (e.g., plus or minus one degrees) from the defined angle or direction.

In FIG. 2, the light source 208 is positioned such that the light from the light source initially travels along an optical path that is aligned with the incident angle α. Thus, in this embodiment, the illumination light from the light source 208 travels along a linear optical path from the light source to the navigation surface 106. However, in other embodiments, the light source 208 may be positioned such that the illumination light from the light source does not initially travel along an optical path that is aligned with the incident angle α. In these embodiments, the illumination lens 210 is configured to change the optical path of the illumination light so that the angle of incidence at the navigation surface is equal to α.

The imaging lens 214 is positioned between the navigation surface 106 and the image sensor 216 to optically manipulate the illumination light reflected from the navigation surface onto the image sensor array 218 of the image sensor. The imaging lens 214 may also be configured to provide magnification or demagnification. As shown in FIG. 2, the illumination light from the light source 208 is reflected from the navigation surface 106 at an angle of β, which is greater than zero with respect to the normal to the navigation surface. In an embodiment, the angle of reflection, β, is equal to the angle of incidence, α. In this embodiment, the light received at the imaging lens 214 is the specular reflection of the illumination light. In the illustrated embodiment, the upper and lower surfaces of the imaging lens 214 are convex surfaces. However, in other embodiments, the imaging lens 214 may have different configurations.

As shown in FIG. 2, the imaging lens 214 is orientated to be substantially horizontal with respect to the navigation surface 106. That is, the optical axis OA of the imaging lens 214 is substantially perpendicular or normal to the navigation surface 106. In comparable conventional optical navigation systems, the imaging lens is tilted at an angle so that the optical axis of the imaging lens is aligned with the angle of reflection of the illumination light from the navigation surface. However, as described above, such orientation results in poor MTF and high distortion. In contrast, the orientation of the imaging lens 214 of the optical navigation system 100 enhances MTF and reduces distortion as compared to conventional optical navigation systems, which improves the tracking performance of the system 100.

Figure 3:
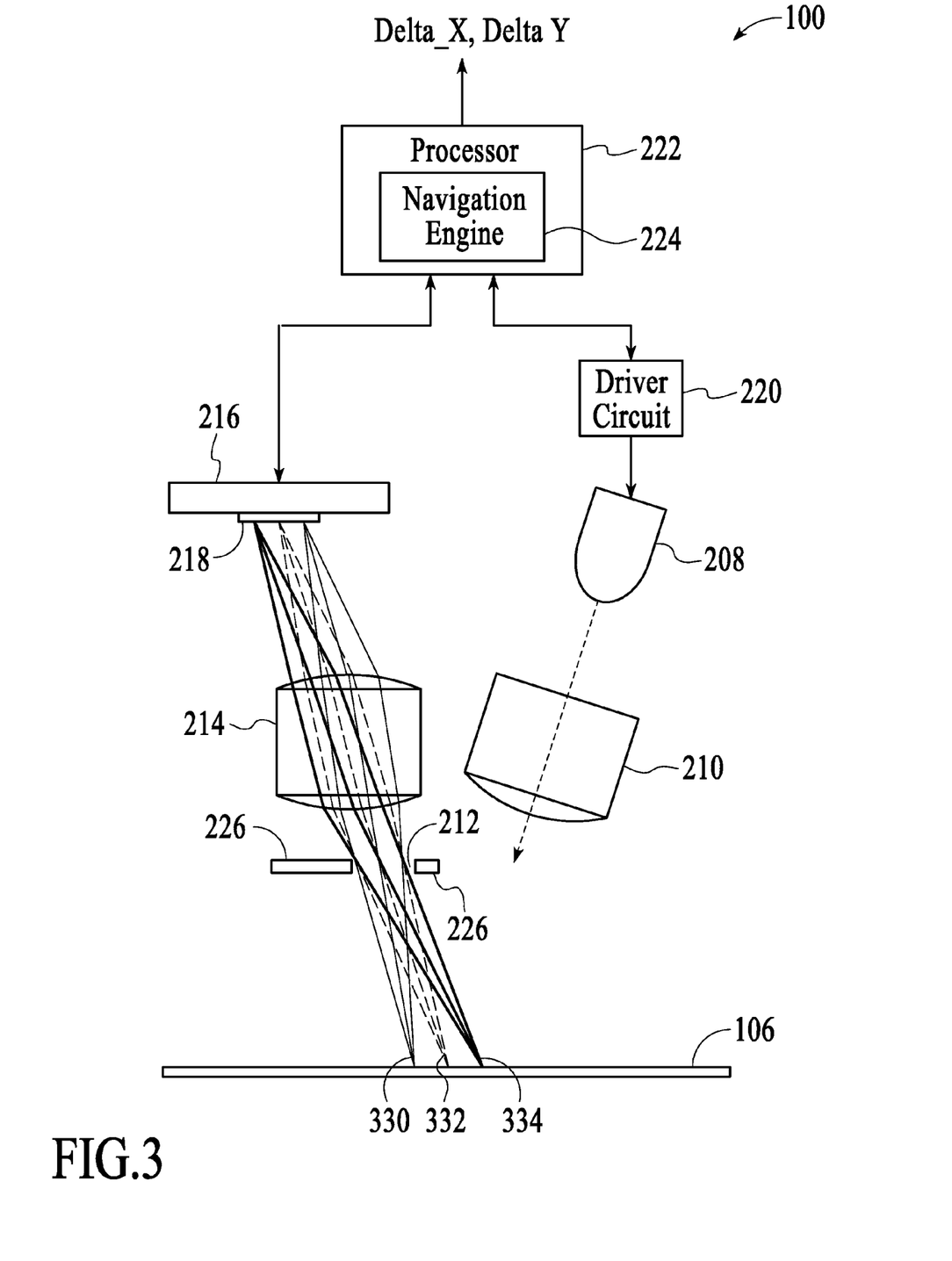
FIG. 3 is another block diagram of the optical navigation system of FIG. 2, showing rays of light transmitted through an aperture and an imaging lens of the system.

The aperture 212 is used to transmit most of the illumination light reflected from the navigation surface 106 towards the image sensor array 218 and to block unwanted light, e.g., light from other light sources and/or surfaces. In the illustrated embodiment, the aperture 212 is positioned between the navigation surface 106 and the imaging lens 214. However, in other embodiments, the aperture 212 may be positioned between the imaging lens 214 and the image sensor array 218 of the image sensor 216. In order to accommodate the horizontal orientation of the imaging lens 214, the aperture 212 is positioned to be offset with respect to the optical axis OA of the imaging lens. That is, the center of the aperture 212 is not aligned with the optical axis of the imaging lens 214 along a direction normal to the navigation surface 106. The aperture 212 may be provided by a hole in an opaque wall or plate 226, which may be structural part of the optical navigation system 100 or the optical mouse 102. As illustrated in FIG. 3, which shows rays of light transmitted through the aperture 212 and the imaging lens 214, the position of the aperture 212 allows only strong angular field rays, such as reflected rays 330, 332 and 334, to be transmitted to the image sensor array 218. As such, incident rays of light that strikes further on the left side of the navigation surface 106 are cut-off by the opaque wall or plate 226. These rays of light are highly deviant, and thus, cause distortion and degrade MTF. By blocking these rays of light, MTF is enhanced and distortion is reduced.

Although the illumination lens 210 and the imaging lens 214 are illustrated as being separate optical elements, these lenses may be integrated into a single optical element formed using an appropriate transparent material.

The image sensor 216 is positioned to receive the light transmitted through the aperture 212 and optically manipulated by the imaging lens 214 at the image sensor array 218. In the illustrated embodiment, the image sensor 216 is orientated so that the light-receiving surface of the image sensor array 218 is substantially parallel to the navigation surface 106, and thus, is also substantially parallel to the imaging lens 214. However, in other embodiments, the image sensor 216 may be orientated so that the light-receiving surface of the image sensor array 218 may be substantially perpendicular to the direction of the reflected light at the angle of reflection, β. The image sensor array 218 includes photosensitive pixel elements (not shown) that generate signals in response to light incident on the elements, where each signal represents the amount or intensity of light incident on a particular element of the image sensor array. These signals are referred to herein as image data. Thus, the image sensor array 218 is able to sequentially capture frames of image data in response to incident light, i.e., the illumination light reflected from the navigation surface 106 and received at the image sensor array 218. These frames of image data are used for correlation to estimate any relative lateral displacement between the optical navigation system 100 and the navigation surface 106. As an example, the image sensor array 218 may be a charge-coupled device (CCD) image sensor array or a complementary metal oxide semiconductor (CMOS) image sensor array. The number of photosensitive pixel elements included in the image sensor array 218 may vary depending on at least the particular application of the optical navigation system 100. As an example, the image sensor array 218 may be a 30×30 array of photosensitive pixel elements. The image sensor 216 also includes circuitry, such as an analog-to-digital converter and row and column decoders, to support the image sensor array 218.

The processor 222 is configured to control the driver circuit 220 and the image sensor 216 in order to provide illumination light on the navigation surface 106 and to capture frames of image data in response to the illumination light reflected from the navigation surface. The processor 222 is electrically connected to the driver circuit 220 and the image sensor 216 to provide control signals. The processor 222 provides control signals to the driver circuit 220 to direct the driver circuit to apply driving signals to the light source 208 to activate the light source. The processor 222 also provides control signals to the image sensor 216 to control the accumulation of electrical signals or charges at the photosensitive pixel elements of the image sensor array 218 to produce each frame of image data for correlation.

In the illustrated embodiment, the processor 222 includes the navigation engine 224, which is programmed into the processor. However, in other embodiments, the navigation engine 224 may be a separate component. Thus, the navigation engine 224 can be implemented as software, hardware and/or firmware. The navigation engine 224 operates to correlate the frames of image data captured by the image sensor 216 to estimate any lateral displacement changes between the optical navigation system 100 and the navigation surface 106 with respect to X and Y directions, which are parallel to the navigation surface. The process of correlating frames of image data for motion estimation or navigation is well known, and thus, is not described herein. In an embodiment, the output of the navigation engine 224 includes directional delta X displacement values and directional delta Y displacement values. Each directional displacement value includes a negative or positive sign information, which indicates direction, and an absolute displacement value, which indicates the amount of displacement in that direction. In a particular implementation, the directional delta X and Y displacement values are generated in the form of hex numbers.

Figure 4:
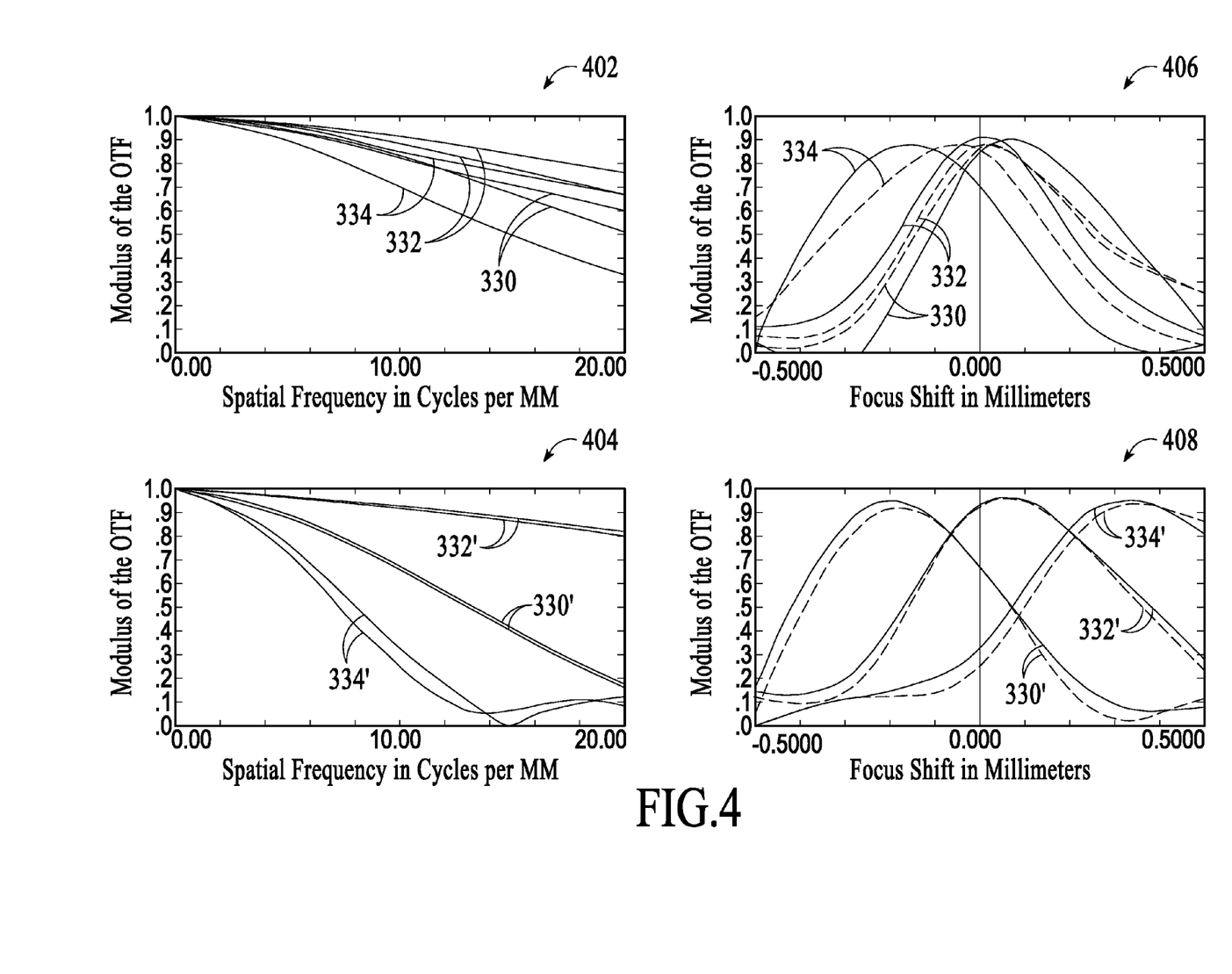
FIG. 4 shows modulation transfer function (MTF) graphs for the optical navigation system of FIG. 2 and a conventional optical navigation system.

The configuration of the optical navigation system 100 results in improvements in the quality of frame of image data captured by the image sensor array 218 of the image sensor 216 with respect to MTF. These image improvements are illustrated in FIG. 4, which includes graphs showing the MTF with respect to spatial frequency and focus shift of the optical navigation system 100 and a comparable conventional optical navigation system. Graph 402 shows the MTF with respect to spatial frequency of the optical navigation system 100, while graph 404 shows the corresponding MTF of the conventional optical navigation system. Graph 406 shows the MTF with respect to focus shift of the optical navigation system 100, while graph 408 shows the corresponding MTF of the conventional optical navigation system. In the graphs 402 and 406, curves for the rays 330, 332 and 334 shown in FIG. 3 are indicated. Similarly, in the graphs 404 and 408, curves for rays 330', 332' and 334', which correspond to the rays 330, 332 and 334, are indicated. As shown in the graphs 402 and 404, the average MTF across the field is higher for the optical navigation system 100. In addition, as shown in the graphs 406 and 408, the MTF for the off-axis rays shows significant increase for the optical navigation system 100. Furthermore, as shown in the graphs 406 and 408, the MTF function for the center ray and off-axis rays are more closely aligned. Therefore, as the optical navigation system 100 is moved, the MTF of each of the features captured for the first and subsequent frames of image data will not change significantly as it moves across the field. Furthermore, since the MTF remain high across the field, the features are more contrasty and easier to recognize. As such, the effectiveness of the navigation engine 224 to track improves since the cross-correlation coefficient will remain high.

Figure 5:
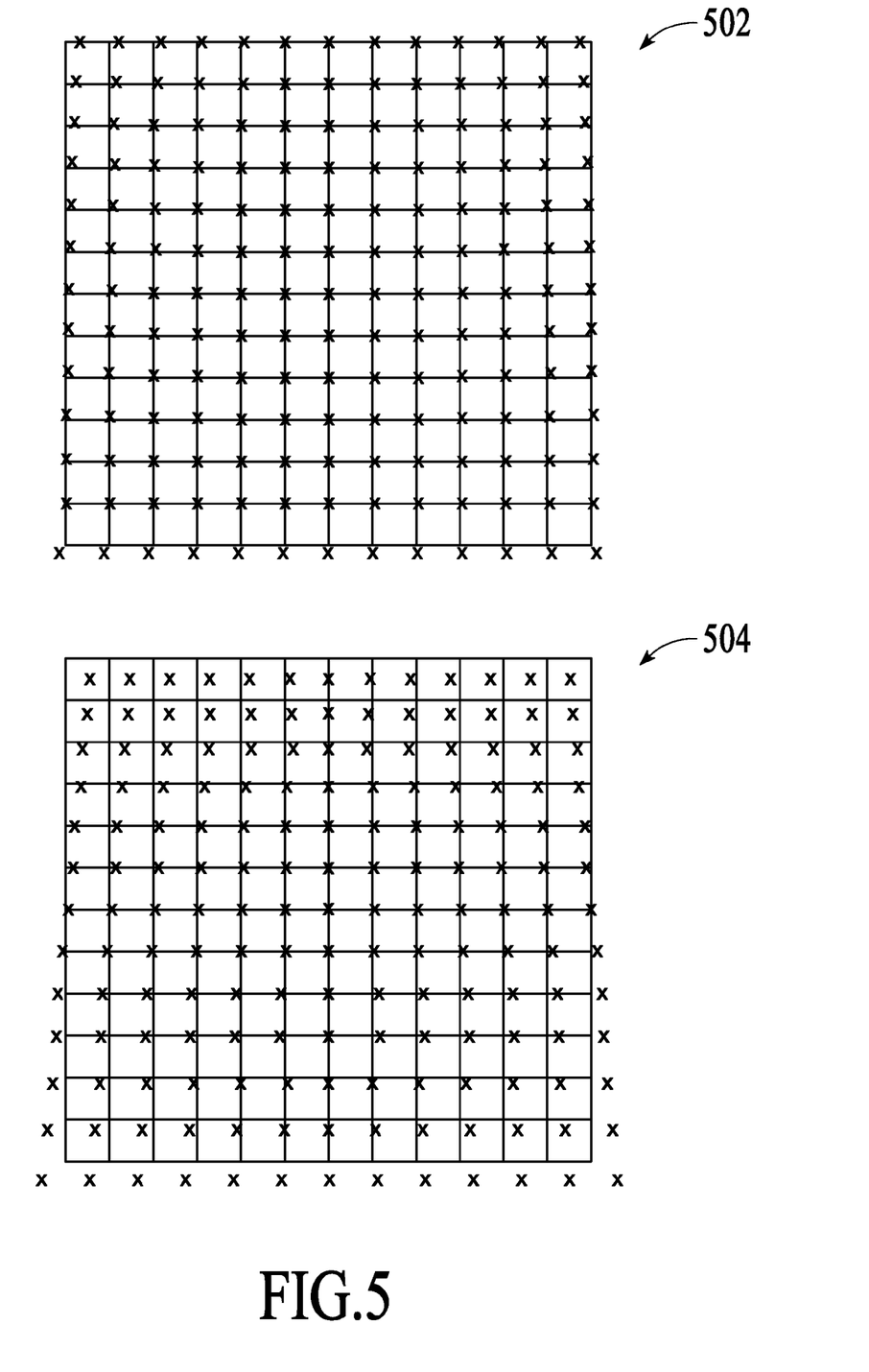
FIG. 5 shows imaging distortion layouts for the optical navigation system of FIG. 2 and a conventional optical navigation system.

The configuration of the optical navigation system 100 also results in image improvements of frame of image data captured by the image sensor array 218 of the image sensor 216 with respect to distortion. These image improvements are illustrated in FIG. 5, which includes imaging layouts 502 and 504 that show distortion for the optical navigation system 100 and the conventional optical navigation system, respectively. As illustrated in the distortion layouts 502 and 504, distortion is significantly reduced in the optical navigation system 100 compared to the conventional optical navigation system. Thus, features at the center and corner of the field will move at almost the same distance and speed. As a result, the navigation engine 224 is able to track the movements of the optical navigation system 100 with respect to the navigation surface 106 more accurately.

Figure 6:
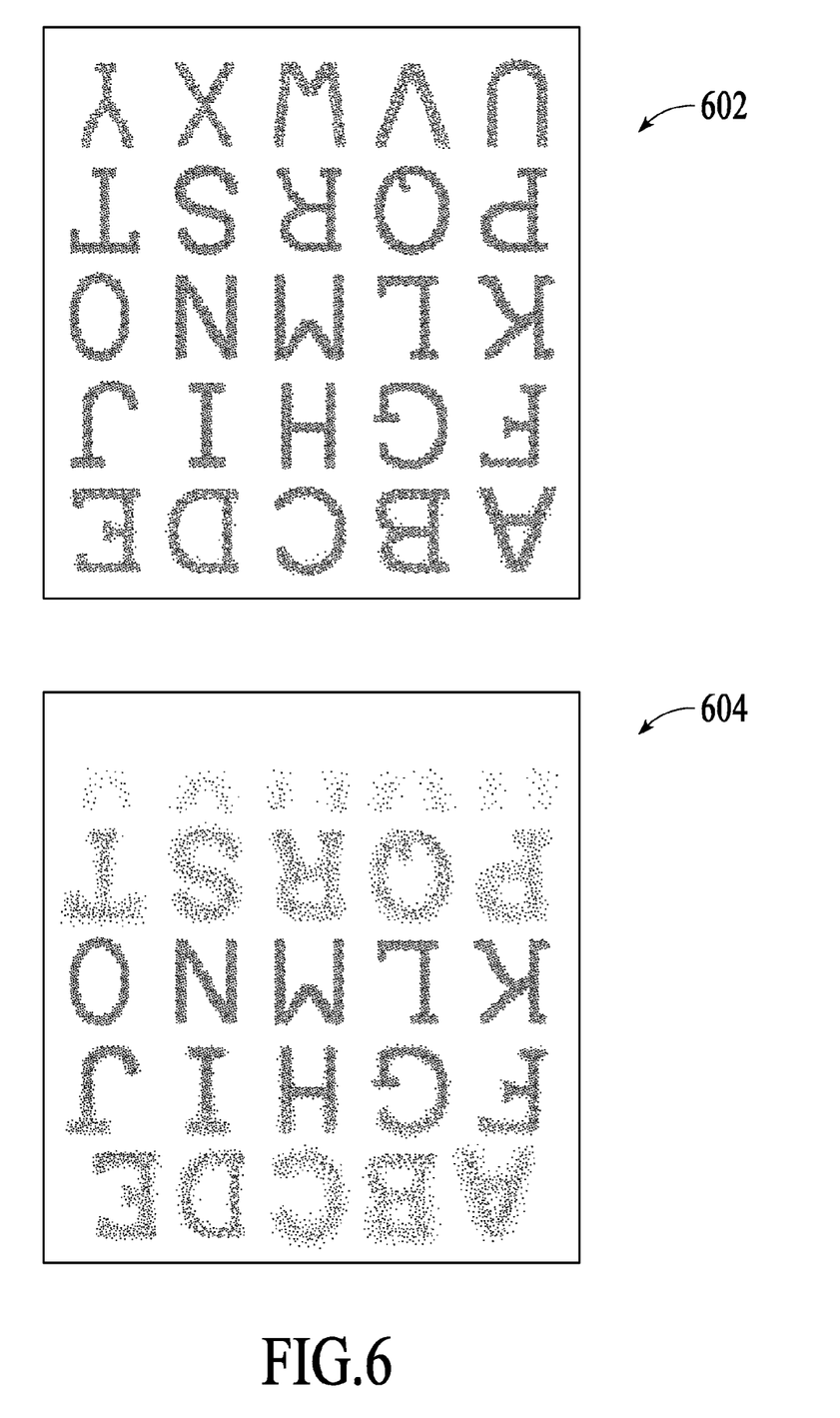
FIG. 6 shows images captured using the optical navigation system of FIG. 2 and a conventional optical navigation system.

Turning now to FIG. 6, these image improvements are shown in images 602 and 604 captured by the optical navigation system 100 and the conventional optical navigation system, respectively. The image improvements in terms of MTF (resolving power) and distortion can be clearly seen from the comparison of the captured images 602 and 604.

Figure 7:
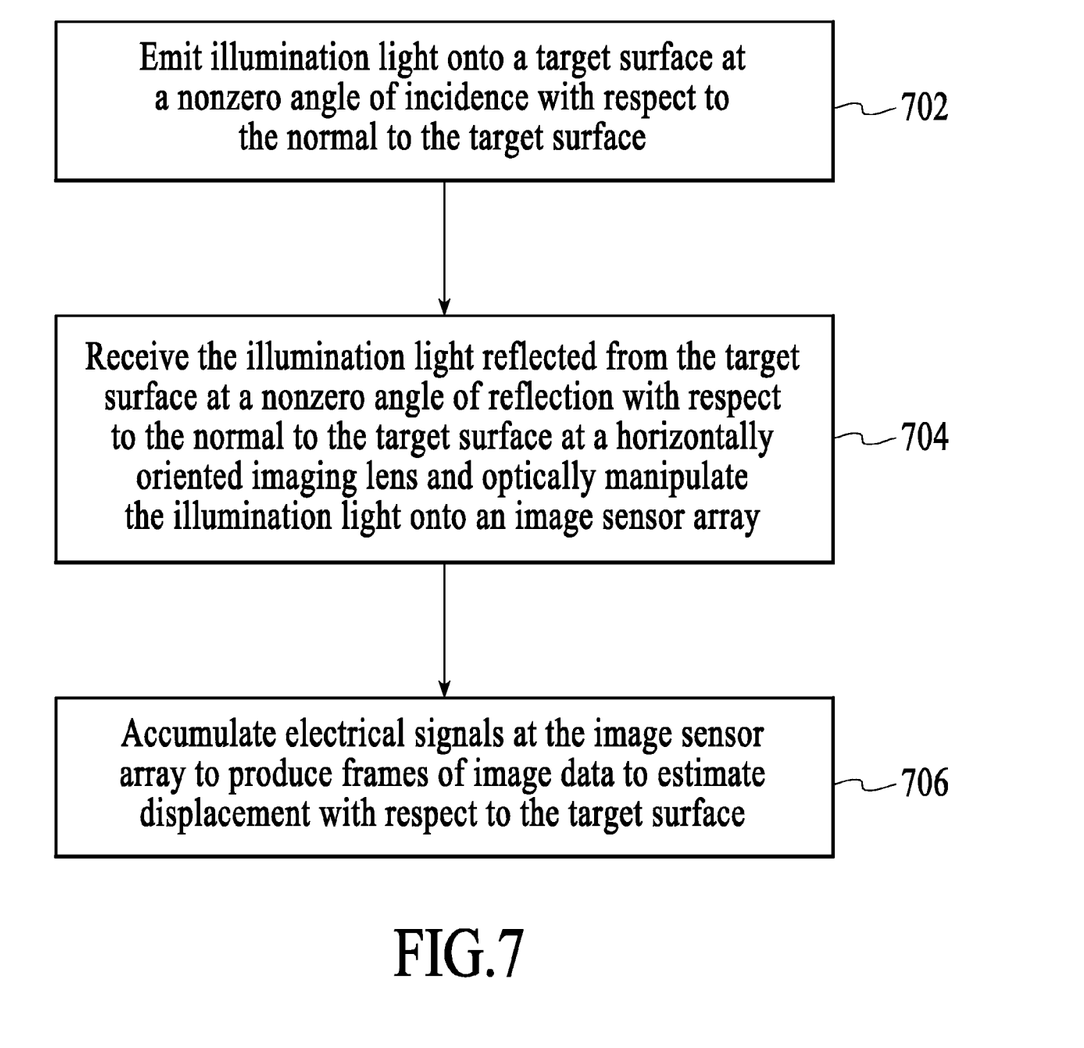
FIG. 7 is a flow diagram of a method for performing optical navigation in accordance with an embodiment of the invention.

A method for performing optical navigation in accordance with an embodiment of the invention is described with reference to a process flow diagram of FIG. 7. At block 702, illumination light is emitted onto a target surface at a nonzero angle of incidence with respect to the normal to the target surface. Next, at block 704, the illumination light reflected from the target surface at a nonzero angle of reflection with respect to the normal to the target surface is received at an imaging lens. In addition, the reflected illumination light is optically manipulated onto an image sensor array by the imaging lens. The imaging lens is orientated to be substantially horizontal with respect to the target surface such that the optical axis of the imaging lens is substantially perpendicular to the target surface. Next, at block 706, electrical signals are accumulated at the image sensor array to produce frames of image data to estimate displacement with respect to the target surface.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A system for performing optical navigation, the system comprising;
   a light source positioned to emit illumination light onto a target surface at a nonzero angle of incidence with respect to the normal to the target surface;
   an image sensor array positioned to receive the illumination light reflected from the target surface at a nonzero angle of reflection with respect to the normal to the target surface to produce frames of image data for correlation to estimate displacement with respect to the target surface; and
   an imaging lens positioned between the target surface and the image sensor array to receive and optically manipulate the illumination light reflected from the target surface at the nonzero angle of reflection onto the image sensor array, the imaging lens being orientated to be substantially horizontal with respect to the target surface such that the optical axis of the imaging lens is substantially perpendicular to the target surface and the optical axis of the imaging lens is offset from the center of the image sensor array.

2. The system of claim 1 wherein the nonzero angle of incidence is equal to the nonzero angle of reflection.

3. The system of claim 1 further comprising an aperture positioned to transmit some of the illumination light reflected from the target surface to the image sensor array, the aperture being positioned to be offset from the optical axis of the imaging lens.

4. The system of claim 3 wherein the aperture is positioned between the target surface and the imaging lens or between the imaging lens and the image sensor array.

5. The system of claim 1 wherein the image sensor array is oriented such that the light-receiving surface of the image sensor array is substantially parallel to the target surface.

6. The system of claim 1 wherein the light source is a light emitting diode or a laser diode.

7. The system of claim 1 further comprising a processor operably connected to the image sensor array, the processor being configured to receive and correlate the frames of image data to estimate lateral displacement between the system and the target surface.

8. The system of claim 1 further comprising an illumination lens positioned between the light source and the target surface, the illumination lens being orientated so that the optical axis of the illumination lens is substantially parallel to the non-zero angle of incidence of the illumination light.

9. A system for performing optical navigation, the system comprising;
   a light source positioned to emit illumination light onto a target surface at a nonzero angle of incidence with respect to the normal to the target surface;
   an image sensor with an array of photosensitive elements positioned to receive the illumination light reflected from the target surface at a nonzero angle of reflection with respect to the normal to the target surface at the array of photosensitive elements to produce frames of image data;
   an imaging lens positioned between the target surface and the image sensor to receive and optically manipulate the illumination light reflected from the target surface at the nonzero angle of reflection onto the array of photosensitive elements, the imaging lens being orientated to be substantially horizontal with respect to the target surface such that the optical axis of the imaging lens is substantially perpendicular to the target surface and the optical axis of the imaging lens is offset from the center of the image sensor array;
   an illumination lens positioned between the light source and the target surface, the illumination lens being orientated so that the optical axis of the illumination lens is substantially parallel to the non-zero angle of incidence of the illumination light; and
   a processor operably connected to the image sensor to receive and correlate the frames of image data to estimate displacement with respect to the target surface.

10. The system of claim 9 wherein the nonzero angle of incidence is equal to the nonzero angle of reflection.

11. The system of claim 9 further comprising an aperture positioned to transmit some of the illumination light reflected from the target surface to the array of photosensitive elements, the aperture being positioned to be offset from the optical axis of the imaging lens.

12. The system of claim 11 wherein the aperture is positioned between the target surface and the imaging lens or between the imaging lens and the image sensor.

13. The system of claim 9 wherein the image sensor is oriented such that the light-receiving surface of the image sensor is substantially parallel to the target surface.

14. The system of claim 9 wherein the light source is a light emitting diode or a laser diode.

15. A method for performing optical navigation, the method comprising:
   emitting illumination light onto a target surface at a nonzero angle of incidence with respect to the normal to the target surface;
   receiving the illumination light reflected from the target surface at a nonzero angle of reflection with respect to the normal to the target surface at an imaging lens, including optically manipulating the illumination light onto an image sensor array, the imaging lens being orientated to be substantially horizontal with respect to the target surface such that the optical axis of the imaging lens is substantially perpendicular to the target surface and the optical axis of the imaging lens is offset from the center of the image sensor array; and
   accumulating electrical signals at the image sensor array to produce frames of image data to estimate displacement with respect to the target surface.

16. The method of claim 15 wherein the nonzero angle of incidence is equal to the nonzero angle of reflection.

17. The method of claim 15 further comprising transmitting some of the illumination light reflected from the target surface through an aperture toward the image sensor array, the aperture being positioned to be offset from the optical axis of the imaging lens.

18. The method of claim 15 wherein the image sensor array is oriented such that the light-receiving surface of the image sensor array is substantially parallel to the target surface.

19. The method of claim 15 further comprising correlating the frames of image data to estimate lateral displacement with respect to the target surface.

20. The method of claim 15 further comprising transmitting the illumination light through an illumination lens, the illumination lens being orientated so that the optical axis of the illumination lens is substantially parallel to the non-zero angle of incidence of the illumination light.

* * * * *